Patented Oct. 16, 1945

2,386,995

UNITED STATES PATENT OFFICE 2,386,995

SYNTHETIC SPONGY MATERIAL

Voorhis F. Wigal, Akron, Ohio, assignor to The B. F. Goodrich Company, New York, N. Y., a corporation of New York No Drawing. Application February 28, 1942, Serial No. 432,798

20 Claims. (Cl. 260—36)

This invention relates to a synthetic spongy material and to a process for preparing the same.

The art of making rubber sponge is very old and well developed. However, there are certain inherent properties of such sponges which greatly limit their usefulness; for example, the ease with which they are attacked by certain solvents, the rapidity with which they deteriorate upon aging, the readiness with which they are attacked by various chemical reagents, the ease with which they burn, etc.

There exists, however, a class of solid polymeric materials which, when plasticized with suitable high-boiling liquids, are changed into resilient, elastic solids which may be used as substitutes for natural rubber to a limited extent because of certain special properties which they possess. These solids are all plasticizable linear polymers of high molecular weight such as soluble cellulose derivatives, e. g. cellulose esters and cellulose ethers, and many polymers made by polymerizing compounds which contain the group

as the sole polymerizable group present, such as polyvinyl formate, polyvinyl acetate, polyvinyl propionate, polyvinyl butyrate, polyvinyl chloride, polyvinyl bromide, other polyvinyl esters, both organic and inorganic, polyvinylidene chloride, polyvinyl ethers, polystyrene, polyacrylic esters, polymethacrylic esters, polyethacrylic esters, mixed polymers (known as copolymers) of the above-named materials such as the copolymers of vinyl chloride and vinyl acetate, vinyl chloride and vinylidene chloride, vinyl ethyl ether and acrylic acid amide, and the like. Also among the useful polymers are such modifications of the foregoing polymers as polyvinyl alcohol, polyvinyl acetals (which may be made from polyvinyl esters) and the partial polyvinyl acetals.

Although the so-called "rubber substitutes" made by mixing the above-named materials with suitable plasticizers have been known for many years, and have many properties which render them superior to rubber for certain specialized uses, no successful method for making useful spongy products from them has been developed. The chief difficulty has been that, since all of these materials are thermoplastic, the addition of sufficient plasticizer to render the composition soft enough so that it can be adequately "blown" causes the material to become so soft that the walls of the pores collapse as soon as formed.

I have now discovered a method for overcoming this difficulty. If the plasticizer employed with the high molecular weight linear polymer be added in two portions, so that the plasticizing effect or solvent action of the first portion is fully attained, while the effect of the second portion is not attained to any considerable extent, but so that it remains dispersed in the composition for the time being as a lubricant or softener, the resulting soft mass may be successfully blown to a sponge by the technique used with natural rubber. Eventually the second portion is caused to exert its plasticizing effect, by causing diffusion into the polymer, either by raising the temperature, or by lapse of a sufficient length of time.

In particular the group of polymers made by polymerizing vinyl esters, both organic and inorganic, and copolymers made from a mixture of monomers in which the predominant constituent is a vinyl ester form sponges which have properties rendering them much superior to rubber sponges for many uses. The term "vinyl ester" as used in the claims is intended to include both organic and inorganic esters. Of this group I prefer to employ polymers of vinyl chloride and copolymers made from monomeric mixtures in which vinyl chloride is the principal ingredient.

The plasticizers which may be used with these polymers are well known; among the most important and most widely used are high-boiling esters, ethers, and ketones, such as tricresyl phosphate, dibutyl phthalate, dioctyl phthalate, tetrahydrofurfuryl esters, ethers, and ketones, butyl phthalyl butyl glycolate, methoxy ethyl phthalate, and the like. In order to obtain the full solvent or plasticizing action from the first portion of plasticizer there are three factors which must be considered: time, temperature, and pressure of mixing. The longer the time, the higher the tempertaure, or the greater the pressure at which the polymer and plasticizer are mixed, the more completely is the solid plasticized. This plasticization may be accomplished by merely stirring the polymer into the plasticizer at an elevated temperature, or by mixing the two ingredients on a hot roll mill, or in an internal mixer, or by any other suitable means. If a high temperature and a high pressure be used, of course, the time required for complete plasticization is greatly reduced.

This portion of the plasticizer may also comprise a portion of the polymer itself which has been only partially polymerized and which because of its relatively low molecular weight has a pronounced plasticizing influence on that part of the polymer which is more highly polymerized.

This type of plasticization may be called "inner plasticization," and may occur in copolymers or mixed polymers as well as in those polymers made from a single monomer. In some cases the inner plasticization alone may be adequate, but usually an additional plasticizing agent is desirable.

The second portion of plasticizer should be added in such a way that its full plasticizing effect or solvent action is not attained, but so that the plasticizer is thoroughly dispersed throughout the mass. This second portion of plasticizer and the plasticized composition remain substantially in separate but intimately mixed phases. This object may be accomplished, for example, by adding the plasticizer at a relatively low temperature, or by adding it at a high temperature and continuing the mixing for only a short period. It is preferred, however, to use a lower temperature and a longer mixing period in order to obtain optimum dispersion with minimum plasticization.

The second portion of plasticizer may be of the same composition as the first or it may be different. For example, the first and second portions may both be tricresyl phosphate; or they may both be a mixture of tricresyl phosphate with dibutyl phthalate; or the first portion may be tricresyl phosphate and the second portion may be dibutyl phthalate. I have found that good results are also obtained when the first part is one of the usual plasticizers and the second part is a "vulcanizable plasticizer," such as is described in U. S. Patent 2,155,590, issued April 25, 1939, to Benjamin S. Garvey. If a vulcanizable or polymerizable plasticizer be used, a catalyst for its polymerization may or may not be added to the mixture to accelerate the polymerization process, depending upon the properties it is desired to obtain in the final sponge.

The total amount of plasticizer used should be enough to give a very soft, dough-like stock—that is, one which is readily adapted to be blown with the usual inflating agents employed in making rubber sponge. If too little plasticizer be used, the resulting sponge will have very small pores with thick walls and will be quite heavy. If too much plasticizer be used, the composition may be so soft that the pores collapse as soon as they are blown.

The relative amounts of plasticizer added in the first and second portions vary, of course, with the particular plasticizers used. In general, however, I have found that an equal division of the plasticizer between the two portions gives satisfactory results, although as much as 70% of the plasticizer may be added either in the first or second portion without greatly impairing the qualities of the product. A useful sponge may be obtained even when as much as 90% of the plasticizer is added in one portion or the other, although such a product tends to be heavy and dead.

The blowing agent or inflating agent used to form the sponge may be any of those commonly used for making solid rubber sponges. These blowing agents may be divided into three classes: (1) volatile substances immiscible with the plasticized polymer composition, such as water, alcohol, gasoline, or the like; (2) chemical agents, such as sodium bicarbonate, ammonium carbonate, ammonium carbamate, ammonium bicarbonate, a mixture of sodium nitrite and ammonium chloride, and the like; (3) inert gases, such as nitrogen, carbon dioxide, etc., forced into the material under high pressure, and caused to form vacuoles upon release of the pressure. Class (1) and class (2) can be called heat-sensitive blowing agents because the formation of gas-bubbles is either caused or greatly accelerated by heating. In connection with sodium bicarbonate it is also desirable to use an acid reagent, such as a fatty acid or other carboxylic acid. The monocarboxylic acids are preferred over inorganic acidic materials because the former are more compatible with and cause less decomposition of the plasticized composition than is the case with the latter. In particular, stearic, lauric, or oleic acid in combination with sodium bicarbonate are particularly desirable blowing agents, producing pores of uniform size with thin walls.

The blowing is ordinarily induced or assisted by heating the mass, especially when heat-sensitive blowing agents are used. The high temperature causes the diffusion of the second portion of plasticizer throughout the polymer, converting the doughy mass to a fully plasticized product which satisfactorily resists collapse of the cells. If blowing is caused by blowing agents of class (3), heating is not essential since plasticization can be accomplished simply by standing to permit diffusion of the second portion of plasticizer but even in this case heating is preferred because it assists expansion of the pores and accelerates transformation of the material to its fully plasticized condition.

In order further to illustrate the details of my invention, I describe the preparation of a sponge from polyvinyl chloride, using, in the first example, a single plasticizer, and in the second, two different plasticizers.

Example I

A mixture of 100 parts by weight of gamma polyvinyl chloride, 75 parts of tricresyl phosphate, and 16 parts of sodium bicarbonate was mixed for about 10 minutes on a roll mill at 250° F. The batch was then cooled to 190° F., the minimum temperature at which a coherent sheet could be kept on the mill, and 75 parts of tricresyl phosphate and 3 parts of stearic acid were mixed in over a period of about 30 minutes. After aging a few hours, a sheet of this composition, having a volume of about one-fifth that of the cavity of the mold, was heated for one hour in a mold 1¼" thick at a temperature of 330° F. to produce a sponge having 400% blow.

Example II

A mixture of 100 parts by weight of gamma polyvinyl chloride, 75 parts of tricresyl phosphate, 10 parts of titanium dioxide, and 8 parts of sodium bicarbonate was mixed on a roll mill at 250° F. for about 13 minutes, then cooled to approximately 190° F., the minimum temperature at which a coherent sheet could be kept on the mill, at which temperature was added 75 parts of diallyl phthalate and 8 parts of stearic acid over a period of 30 minutes. This composition, molded under the same condition as Example I, produced a sponge having 400% blow.

As the product comes from the mold the cells, in general, are discrete and non-interconnected; the sponge in this condition has a rather slow recovery, and the cell walls must be broken before a sponge having a desirably high resiliency is obtained. This breakdown of the cell walls may conveniently be accomplished by passing the material between a pair of rollers after the product, as it comes from the mold, has cooled.

Any of the usual pigments or fillers used in the rubber or plastics industry, such as carbon black, titanium dioxide, barytes, whiting, or the like may be employed in my sponge compositions. Any of the usual stabilizers or age-resistors may likewise be employed.

Although it is preferred to use a mixture of sodium bicarbonate and a fatty acid as the blowing agent, other blowing agents may be used. The blowing agent may be added with either the first or second portion of plasticizer; if a mixture of sodium bicarbonate and fatty acid is used, it is preferred to add the two ingredients separately, adding the acid last, although this order may be reversed or both ingredients may be added together, preferably at the lower temperature.

Aging of the sponge stock before blowing has an important effect upon the sponge produced. For each composition there is a minimum aging period which should be allowed for best results. This period depends upon the particular plastic composition used—the kind and amount of plasticizer, the kind and amount of blowing agent, the temperature of mixing, etc. Control of the aging period and temperature affords a means for very close control over the properties of the final product.

Another effective method of control of the properties of the sponge is through control of the degree of polymerization of the vulcanizable plasticizer, if one is used. The plasticizer may be partly polymerized before incorporation in the composition, or a catalyst, such as an acyl peroxide, may be added to accelerate its polymerization during aging and blowing of the composition.

Any of the methods of heating used for rubber sponge may be used in forming my new synthetic sponge. The composition may be heated in a mold, as in the specific examples, or it may be heated in open steam, or in hot air, etc. Likewise, any of the methods used for the breakdown of cell walls in rubber sponge may be applied to my new sponge.

Sponges produced by my new method are remarkably resilient and rubber-like; in addition, the products of this invention possess special properties, such as resistance to fire, water, organic solvents, corrosive chemicals, deterioration from exposure to air and sunlight, etc., depending upon the particular polymer and plasticizer composition used. The special properties of these plastic compositions are well known in the art and need not be set out in detail here.

Although I have herein disclosed specific embodiments of my invention, I do not intend to limit myself thereto, but only to the extent of the limitations in the appended claims.

I claim:

1. In the process of making a synthetic thermoplastic spongy material by forming pores in a plasticized high molecular weight linear polymer, said polymer being made by the polymerization of a monomeric material consisting substantally of vinyl chloride, the steps which comprise plasticizing said polymer with from 10% to 90% of the total plasticizer necessary for the sponge, and dispersing the remainder of the plasticizer in the composition without substantial plasticizing effect, prior to the formation of the pores.

2. In the process of making a synthetic thermoplastic spongy material by forming pores in a plasticized high molecular weight linear polymer, said polymer being made by the polymerization of a monomeric material consisting substantially of vinyl chloride, the steps which comprise plasticizing said polymer with from 30% to 70% of the total plasticizer necessary for the sponge, dispersing the remainder of the plasticizer in the composition without substantial plasticizing effect prior to the formation of the pores, and heating the resulting composition.

3. In the process of making a synthetic thermoplastic spongy material by forming pores in a plasticized polyvinyl chloride, the steps which comprise plasticizing said polymer with from 10% to 90% of the total plasticizer necessary for the sponge, and dispersing the remainder of the plasticizer in the composition without substantial plasticizing effect, prior to the formation of the pores.

4. In the process of making a synthetic thermoplastic spongy material by forming pores in a plasticized polyvinyl chloride, the steps which comprise plasticizing said polymer with from 30% to 70% of the total plasticizer necessary for the sponge, dispersing the remainder of the plasticizer in the composition without substantial plasticizing effect prior to the formation of the pores, and heating the resulting composition.

5. In the process of making a synthetic thermoplastic spongy material by treating a plasticized polyvinyl chloride with a dispersed blowing agent, the steps which comprise plasticizing said polymer with from 30% to 70% of the total plasticizer necessary for the sponge, and dispersing the remainder of the plasticizer in the composition without substantial plasticizing effect, prior to the formation of the pores.

6. In the process of making a synthetic thermoplastic spongy material by treating a plasticized polyvinyl chloride with a dispersed blowing agent, the steps which comprise plasticizing said polymer with from 30% to 70% of the total plasticizer necessary for the sponge, dispersing the remainder of the plasticizer in the composition without substantial plasticizing effect, and heating the resulting composition.

7. A synthetic thermoplastic spongy material in which the pores consist of blown cells comprising a plasticized polymer, said polymer being made by the polymerization of a monomeric material consisting substantially of vinyl chloride, and said spongy material being prepared by plasticizing said polymer with from 10% to 90% of the total plasticizer necessary for the sponge and dispersing the remainder of the plasticizer in the composition without substantial plasticizing effect, prior to the formation of the pores.

8. A synthetic thermoplastic spongy material in which the pores consist of blown cells comprising a plasticized polymer, said polymer being made by the polymerization of a monomeric material consisting substantially of vinyl chloride, and said spongy material being prepared by plasticizing said polymer with from 30% to 70% of the total plasticizer necessary for the sponge and dispersing the remainder of the plasticizer in the composition without substantial plasticizing effect, prior to the formation of the pores.

9. A synthetic thermoplastic spongy material, in which the pores consist of blown cells, comprising plasticized polyvinyl chloride, said spongy material being prepared by plasticizing the polymer with from 10% to 90% of the total plasticizer necessary for the sponge and dispersing the remainder of the plasticizer in the composition without substantial plasticizing effect, prior to the formation of the pores.

10. A synthetic thermoplastic spongy material, in which the pores consist of blown cells, comprising plasticized polyvinyl chloride, said spongy material being prepared by plasticizing the polymer with from 30% to 70% of the total plasticizer necessary for the sponge and dispersing the remainder of the plasticizer in the composition without substantial plasticizing effect, prior to the formation of the pores.

11. A composition adapted to be converted into a synthetic thermoplastic spongy material when heated which comprises a plasticized polymer, said polymer being made by the polymerization of a monomeric material consisting substantially of vinyl chloride, additional plasticizer dispersed in the plasticized polymer without substantial plasticizing effect, and a blowing agent dispersed therein, said additional plasticizer being from 10% to 90% of the total plasticizer present in the composition.

12. A composition adapted to be converted into a synthetic thermoplastic spongy material when heated which comprises a plasticized polymer, said polymer being made by the polymerization of a monomeric material consisting substantially of vinyl chloride, additional plasticizer dispersed in the plasticized polymer without substantial plasticizing effect, and a blowing agent dispersed therein, said additional plasticizer being from 30% to 70% of the total plasticizer present in the composition.

13. A composition adapted to be converted into a synthetic thermoplastic spongy material when heated which comprises plasticized polyvinyl chloride, additional plasticizer dispersed in the plasticized polymer without substantial plasticizing effect, and a blowing agent dispersed therein, said additional plasticizer being from 10% to 90% of the total plasticizer present in the composition.

14. A composition adapted to be converted into a synthetic thermoplastic spongy material when heated which comprises plasticized polyvinyl chloride, additional plasticizer dispersed in the plasticized polymer without substantial plasticizing effect, and a blowing agent dispersed therein, said additional plasticizer being from 30% to 70% of the total plasticizer present in the composition.

15. In the process of making a synthetic thermoplastic spongy material by forming pores in a plasticized gamma-polyvinyl chloride, the steps which comprise plasticizing said polymer with from 10% to 90% of the total plasticizer necessary for the sponge, and dispersing the remainder of the plasticizer in the composition without substantial plasticizing effect, prior to the formation of the pores.

16. In the process of making a synthetic thermoplastic spongy material by forming pores in a plasticized gamma-polyvinyl chloride, the steps which comprise plasticizing said polymer with from 30% to 70% of the total plasticizer necessary for the sponge, dispersing the remainder of the plasticizer in the composition without substantial plasticizing effect prior to the formation of the pores, and heating the resulting composition.

17. In the process of making a synthetic thermoplastic spongy material by treating a plasticized gamma-polyvinyl chloride with a dispersed blowing agent, the steps which comprise plasticizing said polymer with from 30% to 70% of the total plasticizer necessary for the sponge, dispersing the remainder of the plasticizer in the composition without substantial plasticizing effect, and heating the resulting composition.

18. A synthetic thermoplastic spongy material, in which the pores consist of blown cells, comprising plasticized gamma-polyvinyl chloride, said spongy material being prepared by plasticizing the polymer with from 10% to 90% of the total plasticizer necessary for the sponge and dispersing the remainder of the plasticizer in the composition without substantial plasticizing effect, prior to the formation of the pores.

19. A synthetic thermoplastic spongy material, in which the pores consist of blown cells, comprising plasticized gamma-polyvinyl chloride, said spongy material being prepared by plasticizing the polymer with from 30% to 70% of the total plasticizer necessary for the sponge and dispersing the remainder of the plasticizer in the composition without substantial plasticizing effect, prior to the formation of the pores.

20. A composition adapted to be converted into a synthetic thermoplastic spongy material when heated which comprises plasticized gamma-polyvinyl chloride, additional plasticizer dispersed in the plasticized polymer without substantial plasticizing effect, and a blowing agent dispersed therein, said additional plasticizer being from 10% to 90% of the total plasticizer present in the composition.

VOORHIS F. WIGAL.